United States Patent [19]

Matsuura et al.

[11] Patent Number: 5,229,577
[45] Date of Patent: Jul. 20, 1993

[54] IMAGE FORMING APPARATUS UTILIZING AN AC VOLTAGE CONTROL CIRCUIT

[75] Inventors: Tomoyuki Matsuura; Hideki Furuta, both of Saitama, Japan

[73] Assignee: Fuji Xerox Co., Ltd., Tokyo, Japan

[21] Appl. No.: 564,327

[22] Filed: Aug. 8, 1990

[30] Foreign Application Priority Data

Aug. 17, 1989 [JP] Japan .................................. 1-210758

[51] Int. Cl.⁵ .................................................. H05B 1/02
[52] U.S. Cl. .................................... 219/497; 219/501; 219/508; 219/486; 219/216
[58] Field of Search ............... 219/497, 494, 501, 508, 219/486, 483, 485, 216, 505

[56] References Cited

U.S. PATENT DOCUMENTS

| | | | |
|---|---|---|---|
| 4,493,984 | 1/1985 | Yamauchi | 219/501 |
| 4,540,892 | 9/1985 | Carvalho . | |
| 4,542,281 | 9/1985 | Thompson | 219/216 |

FOREIGN PATENT DOCUMENTS

| | | |
|---|---|---|
| 1296876 | 11/1970 | United Kingdom . |
| 1476699 | 6/1977 | United Kingdom . |
| 2073964A | 10/1981 | United Kingdom . |
| 2181311A | 4/1987 | United Kingdom . |

*Primary Examiner*—Mark H. Paschall
*Attorney, Agent, or Firm*—Finnegan, Henderson, Farabow, Garrett & Dunner

[57] ABSTRACT

An image forming apparatus having a built in AC voltage control circuit which enables the apparatus to be used in regions of the world having commercial power supplies with different supply voltages. The AC voltage control circuit first compares the input voltage to a reference voltage and then performs a switching operation to ensure that the voltage supplied to the AC electric components of the image forming apparatus is the voltage necessary for operation of those components.

16 Claims, 7 Drawing Sheets

IMAGE FORMING APPARATUS UTILIZING AN AC VOLTAGE CONTROL CIRCUIT

BACKGROUND OF THE INVENTION

1. Field of the Invention

The present invention relates to an image forming apparatus for forming an image, such as a laser printer, copying machine, and a facsimile, and more particularly to an image forming apparatus available for such areas where the commercial power supplies have different voltages.

2. Description of the Related Art

In a laser printer of the type in which characters and graphic images are recorded by using a latent image as formed on a photoreceptor, a latent image as formed is developed by toner, and a toner image formed is transferred onto paper. To fix the toner image by heat, an electric heater, for example, a heat roller, is usually used.

Electric components making up the image forming apparatus may be classified into two types, those components as driven by a DC power source, such as transistors and ICs (integrated circuits), and those components as driven by an AC power source, such as the heater. Motors as a power drive source, and a ventilation fan, that have been driven by an AC power source, are frequently driven by a DC power source in recent days. This arises from the facts that the electric components can be controlled with high precision, and that the electric components with the same characteristics can be used in both an area where the frequency of a commercial power supply is 50 Hz, and another area where the frequency of a commercial power supply is 60 Hz.

To drive the heater and some specific electric components in the image forming apparatus, some image forming apparatuses still use the AC power supply because they consume relatively large power and they are controllable by the AC.

FIG. 13 schematically illustrates a circuit arrangement of a fusing unit that has been used in the image forming apparatus, such as a laser printer. As shown, a commercial power supply 1 is connected through a fuse 2 to a fusing heater 4. The heater 4, which is a filament-like heat generating element, is usually contained in a narrow quartz tube.

FIG. 14 shows a mechanical structure of the fusing unit. The heater 4 is fixed to support plates $5_2$ by a set of lamp supports $5_1$. The support plates $5_2$ support collars $6_1$ of a heat roller 6 with the aid of bearings $5_3$. The heat roller 6 is a metal tube, which is coated with heat-resistant resin and has a gear $6_2$, at one end thereof. The gear is in mesh with another gear (not shown). The heat roller receives a turning force through the gear, and is turned by the force. The fuse 2 is in a slight contact with the surface of the heat roller 6 to monitor its surface temperature. One of the power supply lines, which connected to a connector 7, is directly coupled at one end (left end as viewed in the drawing) of the heater 4. The other power supply line is coupled at the other end (right end) of the heater 4, by way of the fuse 2. When the heat roller 6 is accidentally over heated, the fuse 2 is blown to stop the current feed to the heater 4.

A pressure roller 8 being heated is in press contact with the heat roller 6, to provide a nip of a predetermined width. Recorded paper passes through the nip, so that a toner image formed thereon is thermally fixed on the paper.

At this day, industrial products are distributed throughout the world, through import and export. Particularly in the case of a small or portable product, it is frequently carried by its owner, and used in several countries. In this case, the different voltages of the commercial power supplies in the countries become problematic. For example, the power supply voltage in Japan is 100V. In North America, it is 115V or 120V in most of the States. In Middle and Near East, Africa, and Europe, the power supply systems of 220V to 240V are dominantly employed. In adjacent countries or in different regions in the same country, the power supply voltages are often different.

The battery-driven electric products do not require an AC power source. Accordingly, no measure must be taken for the voltage difference of the commercial power supplies of every region or country. As for the DC electric components, such as ICs and DC motors, a power supply forms both voltages 24V and 5V in the stage of converting from an AC power supply into a DC power supply. Accordingly, also in those electric components, there is no need of taking any measure for the power supply voltage difference.

In the case of the fusing unit shown in FIGS. 13 and 14 using the electric components that are directly driven by the AC power supply, the electric components cannot be used from one region to another region where the power supply voltage is greatly different. For example, if a heater specified to be operable at 100V is used in a region where the power supply voltage is 200V, more current flows through the heater, which may damage the heater or burn related circuit parts. On the other hand, if a heater specified to be operable at 200V is used in a region where the power supply voltage is 100V, the heater is insufficiently heated, so that the fusing unit containing the heater fails to fix the toner image or it takes a long time until the satisfactory fuse fix becomes possible. Accordingly, such a use of the heater is unpractical.

For the above reasons, the electric components such as the heater are manufactured for each commercial power source voltage. Those components are selectively assembled into the copying machines according to regions or countries where the machines are to be used. Accordingly, in manufacturing the image forming apparatuses to be exported to many countries, the electric components operable by the DC power are available for all of the apparatuses. However, the electric components operable by the AC power must be specified according to the electric power supply systems employed by the countries. Many types of electric components, which comply with the specifications of the importing countries, must be manufactured and stored. This increases the cost to manufacture the components, and requires intricate management of storing many types of components. The heater, as shown in FIG. 14, is usually covered with a quartz tube, for example, in order to ensure a high temperature. The quartz tube is fragile, and is easily broken when it is carelessly touched by laymen not accustomed to handling it. However, it is not practical to have servicemen carry and replace all the quartz tubes necessary for the different power supply voltages used.

SUMMARY OF THE INVENTION

Accordingly, a first object of the present invention is to provide an image forming apparatus which allows use of the AC components, which may be used with the different voltages of the commercial power supplies.

A second object of the present invention is to provide an image forming apparatus which allows the use of a heater without changing an input voltage for different voltages of the commercial power supplies.

An image forming apparatus according to the present invention comprises: (i) voltage comparing means for comparing an AC input voltage with a predetermined reference voltage; (ii) an AC electric component operable by an AC voltage as applied thereto; and (iii) voltage providing means for converting the AC input voltage to substantially half of the AC input voltage. When the voltage comparing means decides that the AC input voltage is lower than the reference voltage, the voltage providing means applies the AC input voltage to the AC electric component, and when the voltage comparing means decides that the AC input voltage is higher than the reference voltage, the voltage providing means applies the converted voltage to the AC electric component.

The inventor noticed the fact that the voltages of the power supply systems in the world are generally classified into two groups, one including 100V and its near voltages, and the other including 200V and its near voltages. In the present invention, by utilizing this fact, the image forming apparatus recognizes the group to which an input AC voltage belongs on the basis of the result of comparing the input AC voltage with a reference voltage, and changes the voltage.

Further, an image forming apparatus according to the present invention comprises: (i) voltage comparing means for comparing an AC input voltage with a predetermined reference voltage; (ii) a pair of heaters with substantially the same characteristics operable by an AC voltage as applied thereto and (iii) connection control means. When the voltage comparing means decides that the AC input voltage is lower than the reference voltage, the connection control means connects the pair of heaters in parallel, and when the voltage comparing means decides that the AC input voltage is higher than the reference voltage, the connection control means connects the pair of heaters in series.

In this case, two heaters operable at about 100V are provided. When the input voltage is 100V or its near figure, those heaters are connected in parallel. When it is 200V or its near figure, the heaters are connected in series. In the series connection of the heaters, 200V are shared by the two heaters, 100V for each heater. Thus, by utilizing a pair of heaters, the image forming apparatus can cope with the problem of the power voltage difference without changing the input voltage.

BRIEF DESCRIPTION OF THE DRAWINGS

FIG. 1 shows a circuit arrangement of an AC voltage control section of the low voltage power supply;

FIG. 2 shows a schematic diagram of a laser printer as a specific form of an image forming apparatus according to the embodiment of the present invention;

FIG. 3 is a block diagram showing a key portion of a circuit arrangement contained in the laser printer thus structured; and FIG. 4 shows a circuit diagram of a fusing unit used in the instant embodiment.

FIG. 5 is a circuit arrangement of a fixation unit as a modification of the present invention, and its low power voltage supply;

FIG. 6 shows a simplified circuit diagram of a key portion of the circuit of FIG. 5;

FIG. 7 shows the simplified circuit diagram when the heaters 4A and 4B are connected in parallel;

FIG. 8 shows the simplified circuit diagram when the heaters 4A and 4B are connected in series;

FIG. 9 is a longitudinal sectional view showing a structural arrangement of the fusing unit according to this modification, which corresponds to that of FIG. 14;

FIG. 10 shows the detail of each check plate;

FIG. 11 shows a side view of the structure when a base portion of the heater is mounted to the check plate; and FIG. 12 is a diagram showing the structure when the couple of heaters are fastened to the check plate in the above manner.

DESCRIPTION OF THE PREFERRED EMBODIMENTS

The present invention will be described in detail by describing the preferred embodiments.

Laser Printer

Figure 2:
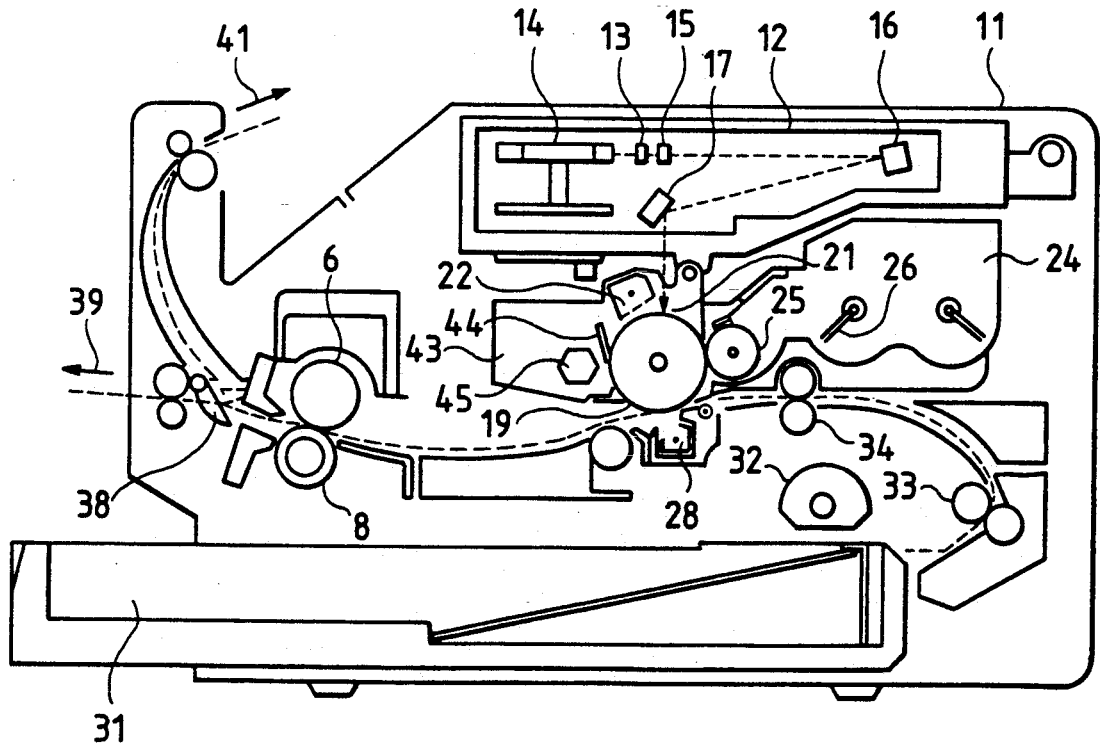

FIG. 2 shows a schematic diagram of a laser printer as a specific form of an image forming apparatus according to an embodiment of the present invention.

A laser printer 11 is provided with a laser scanning unit 12. Disposed within the laser scanning unit 12 is a laser diode 13 for modulating a laser beam by an image signal and emitting the modulated laser beam. The laser beam emitted from the laser diode 13 is incident on a polyonal mirror 14 and is deflected in accordance with rotation of the polyonal mirror. The deflected laser beam passes through an fθ lens 15, and guided by mirrors 16 and 17, and output from the laser scanning unit 12. A photoreceptor 19 turning at a fixed speed is disposed under the laser scanning unit 12. The laser beam emitted from the laser scanning unit 12 hits a predetermined exposure position on the photoreceptor 19, and repeatedly scans there in the axial direction of the photoreceptor, viz., in the main scan direction. Upstream of the exposure position 21 a charge corotron 22 is disposed facing the photoreceptor 19. The corotron 22 uniformly charges the surface of the photoreceptor 19. The surface of the photoreceptor 21 after charged is irradiated with the laser beam, so that an electrostatic latent image represented by the image information contained in the laser beam is formed on the drum surface. The latent image is developed by a developing unit 24 in a location of the photoreceptor surface downstream of the exposure position. The developing unit 24 contains a developing roller 25 for developing the latent image by toner with the aid of magnetic force, and a toner feed mechanism 26 for feeding toner from a cartridge to the developing roller 25, and the like. The developing unit 24 is applied with a predetermined developing bias voltage.

A toner image emanating from the developing unit, with rotation of the photoreceptor drum 19, is moved to a location where it faces a transfer corotron 28. In this location, the toner image on the photoreceptor surface is electrostatically transferred onto recording paper (normal paper).

A transfer path of the paper will be described in brief. Recording papers (not shown) are stacked in a cassette tray 31 which is removably set in the lower portion of the laser printer 11. The uppermost paper of the stack in the tray 31 is fed out of the tray by means of a semicircular roller 32. The semicircular roller 32 may be replaced by any other suitable means, such as a retard roller.

The paper as fed out is transferred along a path as indicated by a broken line by means of a transfer roller 33. When its leading end reaches a register roller 34, the paper is temporarily stopped. Afterwards, an electromagnetic clutch (not shown) causes the register roller 34 to start to turn, at a rotating position of the photoreceptor drum 19. The paper starts to stably advance at a fixed speed. In this way, the paper travels between the photoreceptor 19 and the transfer corotron 28, at a desired timing. At this time, the transfer corotron 28 discharges, so that a toner image on the photoreceptor drum 19 is electrostatically attracted toward the corotron 28, and transferred onto the paper. A charge removal needle disposed downstream of the corotron 28 is applied to the rear side of the paper having the transferred toner image, to remove charges from the paper. Then, the paper is peeled off from the photoreceptor surface. The paper as peeled off is transferred along a transfer path of a predetermined length, to remove a strain of the paper. Then, it is transferred to a fusing unit made up of a heat roller 6 and a pressure roller 8. In the fusing unit, the paper passes while being nipped between the heat roller 6 and the pressure roller 8, which are in press contact with each other in the range of a predetermined width. At this time, the toner image transferred side of the paper is in contact with the heat roller 6, while the pressure roller 8 presses the paper against the heat roller 6, thereby to realize an effective heat transfer. The heat roller 6 is kept at a fixed high temperature. Under this condition, the toner image on the paper is fused and fixed on the paper.

A guide plate 38 is provided at the exit of the fusing unit, and selectively guides the paper emanating from the fusing unit to one of two exit paths, a first exit path 39 and a second exit path 41. The first exit path 39 straightforwardly extends from the transfer path along which the paper from the fusing unit travels. The second exit path 41 is curved upwardly from the exit, and turned to the right as viewed in the drawing, viz., in the direction substantially opposite to that of the first exit path 39. The paper as has traveled along the second exit path is ejected outside from the upper portion of the laser printer 11. Since the two exit paths are provided, the paper can be ejected outside, with its recorded side facing up or down. When the guide plate is operated to select the second exit path 41, the record papers or copies are delivered outside with its recorded side facing down, and successively stacked in a tray. In this case, a stack of copies can be bound by a stapler without rearranging the stacked copies.

The toner image as not transferred onto the paper or left on the photoreceptor surface is removed from the photoreceptor surface by a cleaning unit 43 disposed downstream of the transfer corotron 28. The cleaning unit 43 includes a blade 44 for scraping off the toner from the drum surface, and a rotating member 45 for delivering toner particles deposited under the blade 44 to a storage location.

Circuit Arrangement

Figure 3:
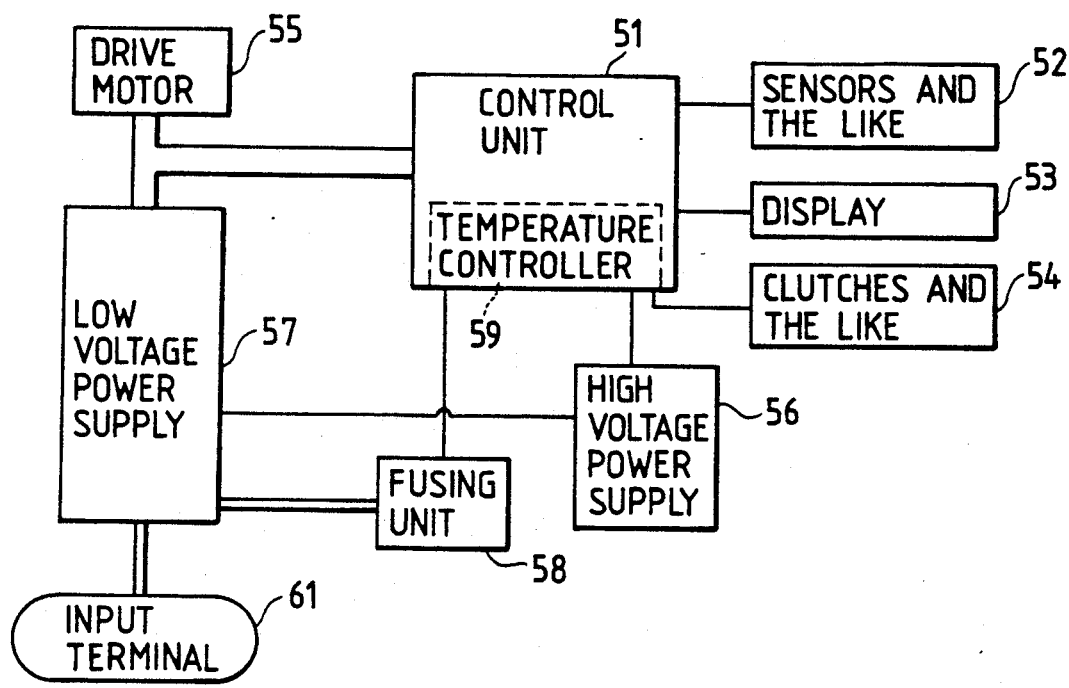

FIG. 3 is a block diagram showing a key portion of a circuit arrangement contained in the laser printer thus structured. The laser printer 11 uses a control unit 51 containing a central processing unit (CPU). The control unit 51 executes a control according to a control program stored in a read only memory contained therein. The control unit 51 is connected to various components, such as sensors and the like 52 for checking transfer states of record paper, a display 53 mounted on an operation panel (not shown), clutches and the like 54 for drive control, and a drive motor 55. The control unit 51 is further connected to a high voltage power supply 56 for supplying a high voltage to the charge corotron 22, for example, a low voltage power supply 57 for supplying a low voltage to a printed board (not shown), for example, and a fusing unit 58 for controlling electric power to the heat roller 6. The fusing unit 58 transfers and receives data to and from a temperature control section 59 for controlling a fusing temperature, which is contained in the control unit 51. The low voltage power supply 57 receives an AC power source from an AC input terminal 61, and produces a DC power source at a low voltage. Further, it supplies an AC power source to the fusing unit 58.

AC Voltage Control Circuit

Figure 1:
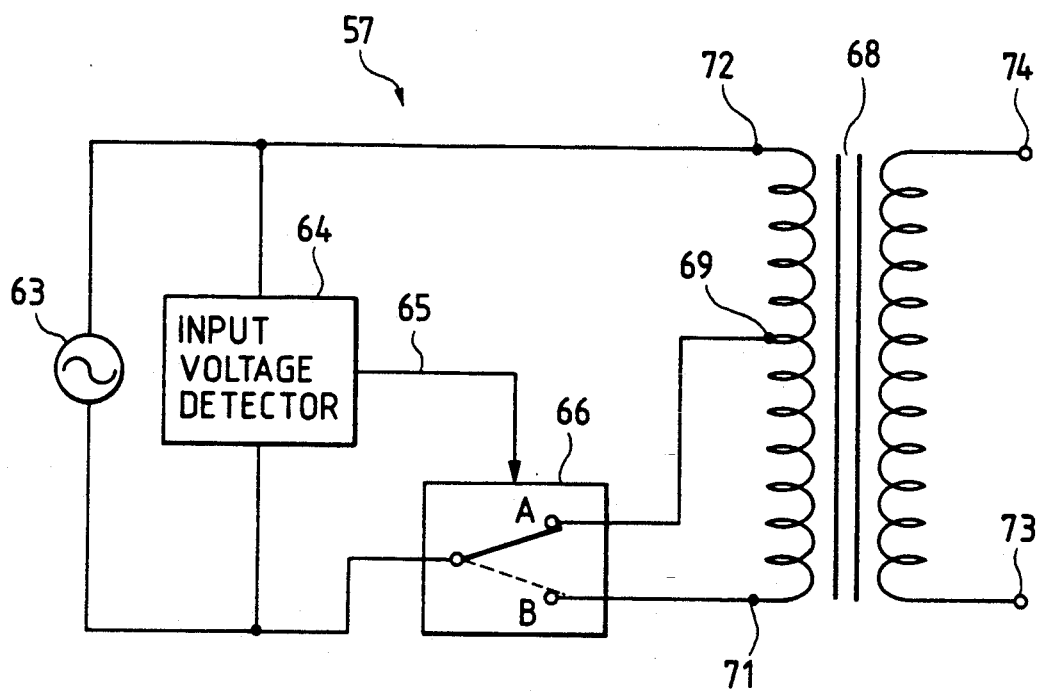
In FIGS. 1 through 4 showing diagrams for explaining an embodiment of the present invention.

FIG. 1 shows a circuit arrangement of an AC voltage control section of the low voltage power supply according to the present embodiment. An AC power source 63 supplied from the input terminal 61 shown in FIG. 3 is input to an input voltage detector 64 within the low voltage power source 57. The input voltage detector 64 checks whether an input AC voltage is above or below 150V. The detector can readily be realized by using IC package for voltage comparison as commercially available. In this case, the above voltage is appropriately formed and applied to the reference voltage terminal of the IC. The input voltage detector 64 produces the check result in the form of a switching control signal 65, which is applied as a control signal to a power relay 66. The power relay 66, coupled with one end of the AC power source 63, functions to select contact A or contact B according to the type of the control signal 65. The contact A is connected to a midpoint 69 of the primary winding of a transformer 68. The contact B is connected to one end 71 of the winding of the transformer 68. The other end 72 of the primary winding is connected to the other end of the AC power source. Both ends 73 and 74 of the secondary winding of the transformer 68 are coupled with the input terminals of the fusing unit 58 shown in FIG. 3.

When the input voltage detector 64 detects an input voltage of 150V or less, the power relay 66 selects the contact A. When it detects an input voltage of more than 150V, the power relay 66 selects the contact B. If the input AC voltage is between 90V and 120V, that voltage, as it is, is output from the secondary winding of the transformer 68. When it is between 200V and 250V, that voltage is halved into a voltage between 100V and 125V, and the halved voltage is output from the secondary winding of the transformer 68. With this feature, the same fusing unit can be used in any region and any country of the world.

Figure 4:
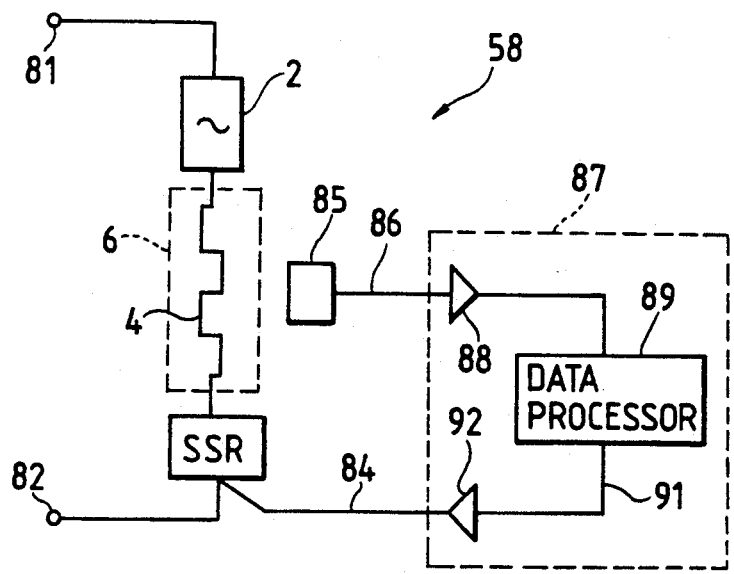
Figure 14:
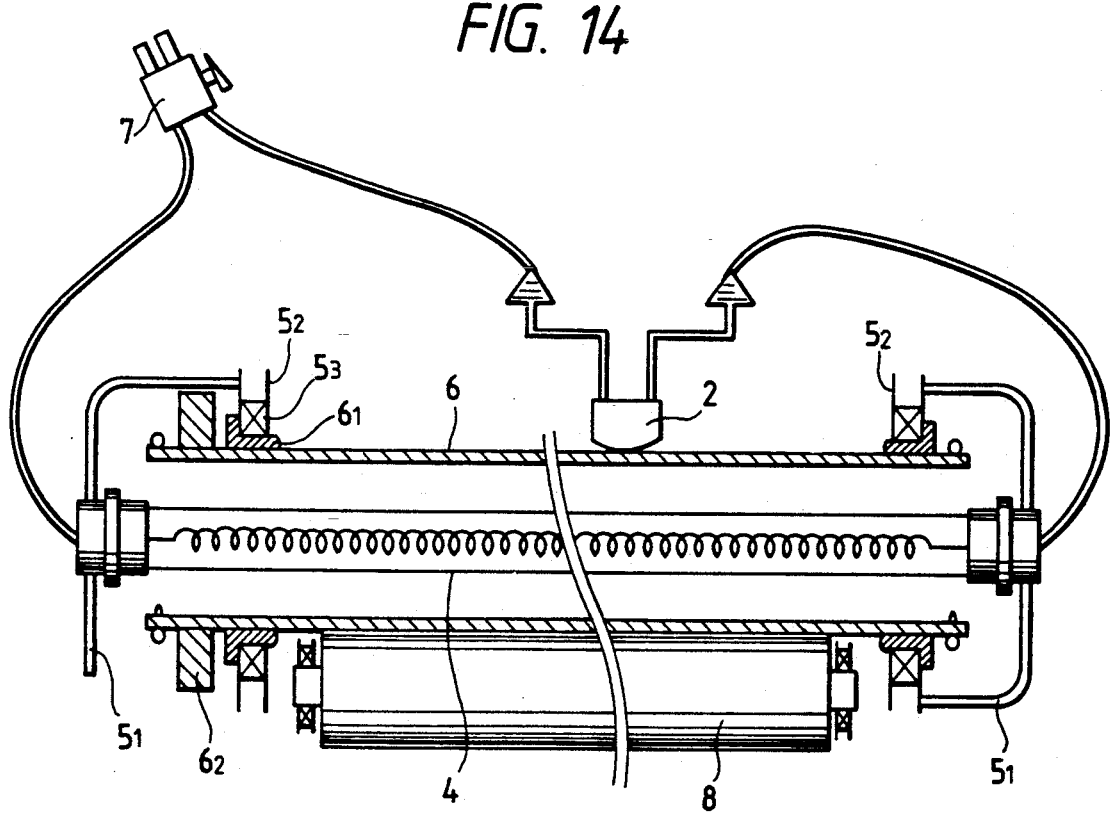
FIG. 14 shows a mechanical structure of the fixation unit.

FIG. 4 shows a circuit diagram of a fusing unit used in the instant embodiment. As shown, the AC input terminals 81 and 82 are coupled with both ends 73 and 74 of the secondary windings of the transformer 68 shown in FIG. 1. A fuse 2, heater 4, and a solid state relay (SSR) 84 are connected in series between those input terminals 81 and 82. The fuse 2 is in light contact with the heat roller 6 as shown in FIG. 14, and is broken when the heat roller 6 is over heated.

The surface temperature of the heat roller 6 is also detected by a thermistor 85. Temperature data 86 as detected by the thermistor 85 is transferred to a temperature control unit 87. In the control unit 87, the data is applied through a data input buffer amplifier 88 to a data processor 89. In the data processor 89, and A/D converter contained therein converts the temperature data as analog data into digital data. A CPU contained forms a temperature control signal 91 which depends on the surface temperature. The control signal 91 passes through a data output buffer 92, and reaches a control terminal of the SSR. In this way, the current is fed to the heater. An AC voltage to control the SSR 84 is usually between 90V and 125V. Accordingly, in any region and any country of the world, the laser printer 11 can optimally control the surface temperature of the heat roller 6.

Modifications

Figure 5:
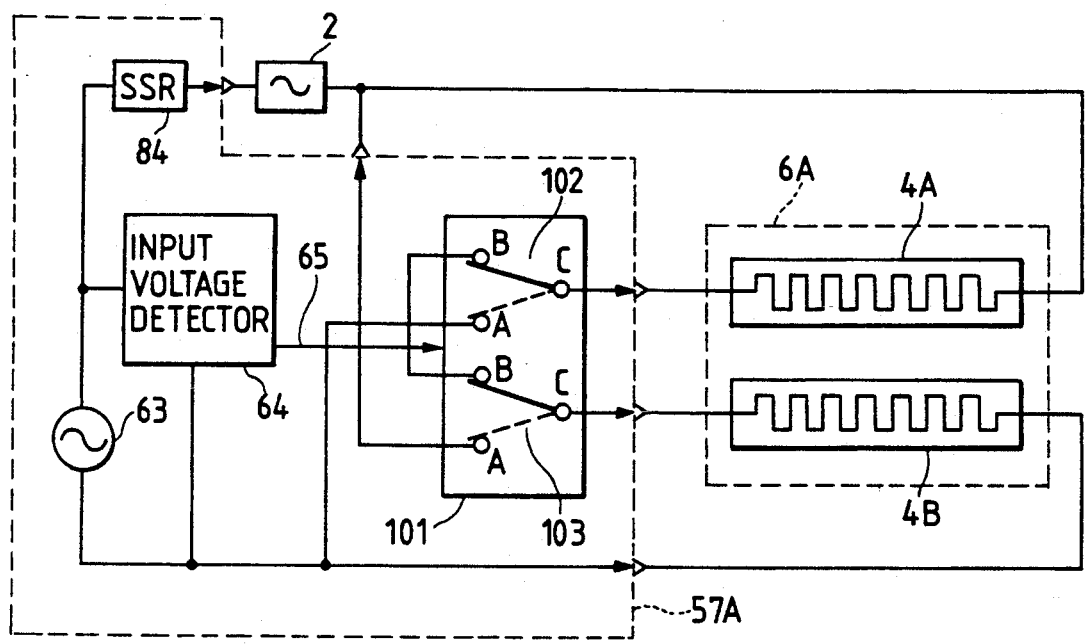
In FIGS. 5 through 12 showing diagrams for explaining a modification of the invention.

FIG. 5 is a circuit arrangement of a fusing unit as a modification of the present invention, and its low power voltage supply. In this modification, a low voltage power supply 57A contains an AC power source 63, input voltage detector 64 for checking whether the input AC voltage belongs to a relatively high voltage region or a relatively low voltage region, solid state relay 84, and a power relay 101. A fuse 2 that is connected in series to the SSR 84, and a heat control 6A are disposed outside the low voltage power supply 57A. A couple of heaters 4A and 4B that are exactly the same in shape and characteristic, are contained in the heat roller 6A. The power relay 101 connects those heaters 4A and 4B selectively in series or parallel.

To be more specific, first and second switches 102 and 103, that are interlocked with each other, are contained in the power relay 101. In response to the switching control signal 65 from the voltage detector 64, those switches are turned to contacts A or B. One end of the heater 4A is connected to one end of the AC powers source 63, by way of the SSR 84 and the fuse 2. The other end of the heater 4A is connected to the terminal C of the first switch 102. The contact B of the first switch 102 is connected to the contact B of the second switch 103. The contact A of the second switch 103 is connected to one end of the heater 4A. The contact A of the first switch 102 is connected to one end of the heater 4B and the other end of the AC power source 63. The terminal C of the second switch 103 is connected to the other end of the heater 4B.

When the input voltage detector 64 detects a voltage of 150V or less as supplied from the power source 63, the contacts C are respectively turned to the contacts A in the power relay 101, as indicated by dotted lines. The voltage of the power source 63 is directly applied to both ends of each heater 4A and 4B.

When the detector 64 detects the input voltage of higher than 150V, the contacts C of the power relay 101 are respectively turned to the contacts B, as indicated by solid lines. Under this condition, the heaters 4A and 4B are connected in series, and the voltage of the AC power supply 63 is applied to both ends of the series connection of the heaters.

Figure 6:
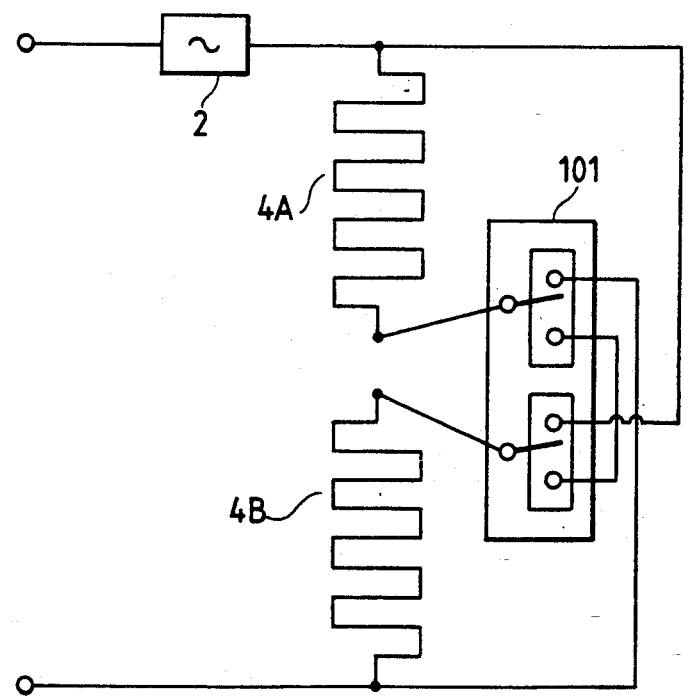
Figure 7:
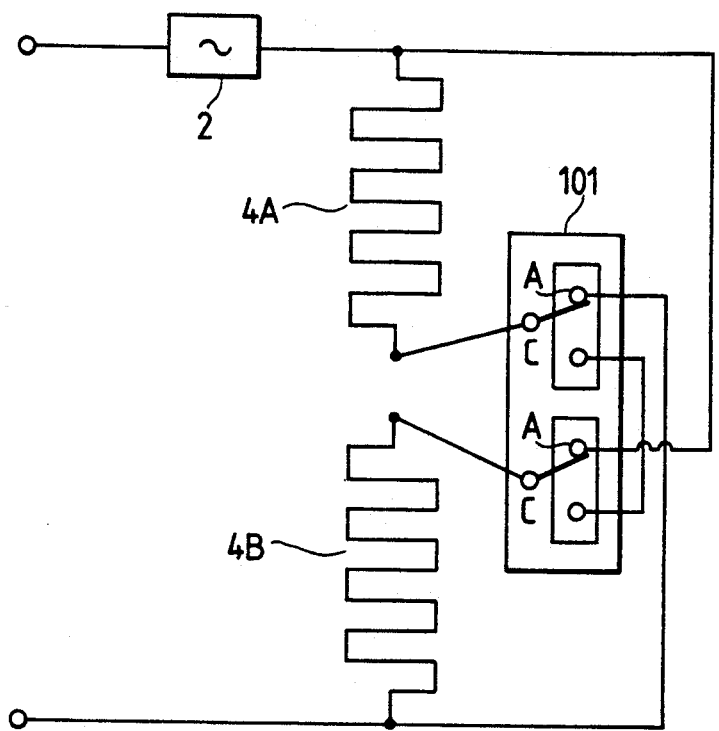
Figure 8:
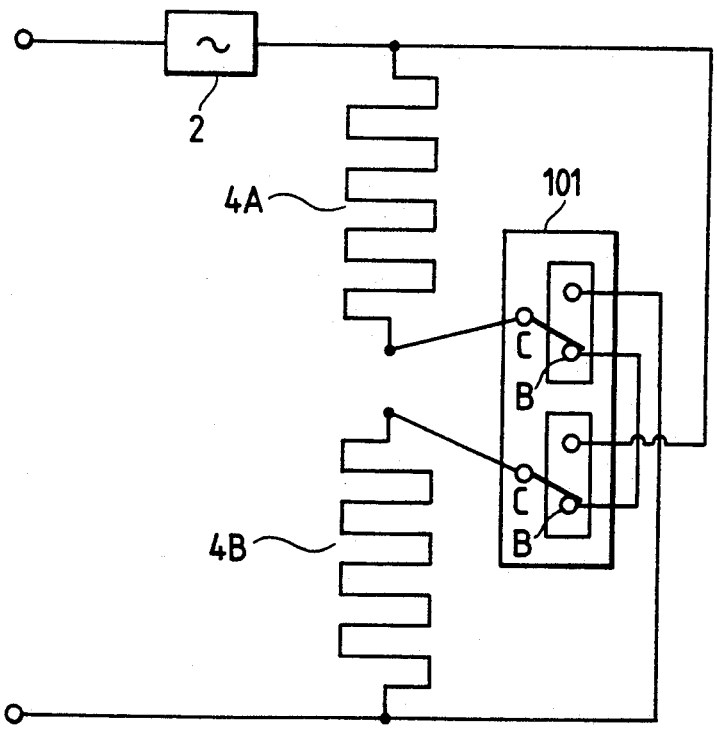

FIG. 6 shows a simplified circuit diagram of a key portion of the circuit of FIG. 5. FIG. 7 shows the simplified circuit diagram when the heaters 4A and 4B are connected in parallel. FIG. 8 shows the simplified circuit diagram when the heaters 4A and 4B are connected in series.

Where the voltage of the AC power source 63 belongs to the power supply system of 100V to 115V, for example, the two heaters 4A and 4B are connected in parallel, as shown in FIG. 7. If those heaters are lamps of 300 W, the total power consumption is approximately 600 W. Where it belongs to the power supply system of 200V to 240V, the two heaters 4A and 4B are connected in series as shown in FIG. 8. Also in this case, the total power consumption is approximately 600 W. Accordingly, in any region and any country of the world, the laser printer 11 can optimally control the surface temperature of the heat roller 6.

It is noted that the couple of heaters 4A and 4B are both operated for any voltage of the AC power source 63, and one of the heaters is not used as a backup heater, which is operated when the other is broken. It is further noted that the heaters 4A and 4B are different from those used in the fusing unit as described in Japanese Utility Model Unexamined Publication No. Sho. 63-150967. In the publication, one of the two heaters is heated by the AC power source, while the other is heated by a battery. Such a precision of the characteristics of the heaters 4A and 4B in the instant embodiment as to provide a satisfactory fusing when they are connected in series and parallel, suffices. In other words, a variation of resistance of each heater within the range ensuring such a characteristic precision is tolerable.

Figure 9:
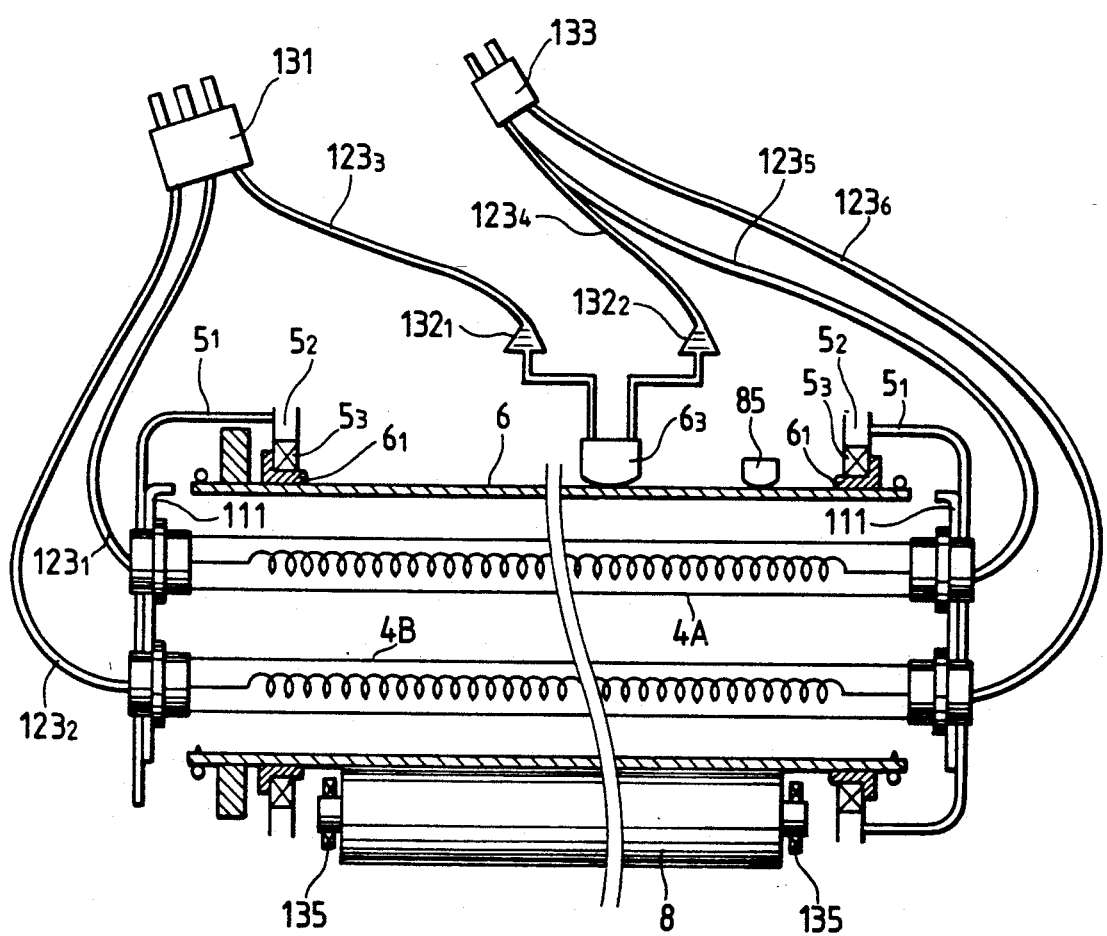

FIG. 9 is a longitudinal section view showing a structural arrangement of the fusing unit according to this modification, which corresponds to that of FIG. 14. A couple of heaters 4A and 4B are fastened to check plates 111. The check plates 111 are fixed to support plates $5_2$ by lamp supports $5_1$.

Figure 10:
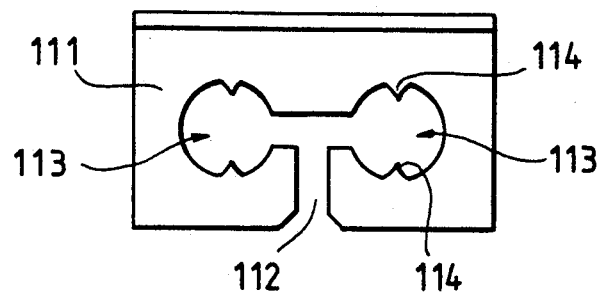

FIG. 10 shows the detail of each check plate 111. The check plate 111 consists of a rectangular metal plate having a thickness of 0.1 to 0.2 mm. The rectangular plate is bent in an L shape as viewed in cross section, for reinforcing purposes. The plate having a longer leg of the L shape is cut away in a T-like shape denoted as 112. Both end portions of the cross bar of the T are opened and each opening is shaped circularly. A pair of pawls 114 protrude in opposite directions from each circular opening. When the check plates 111 are too thick, they cannot satisfactorily fix the heaters 4A and 4B in place. When made too thick, the heaters 4A and 4B tend to be scraped by the pawls 114 when they are mounted to the check plates 111.

Figure 11:
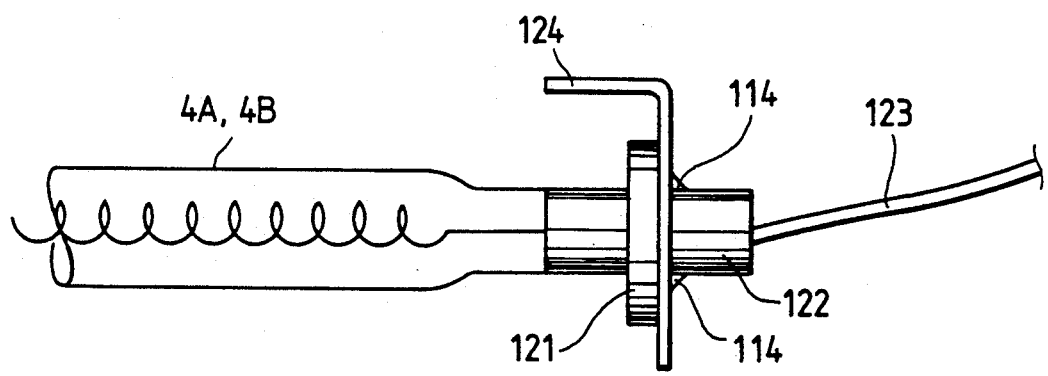

FIG. 11 shows a side view of the structure when a base portion of the heater is mounted to the check plate 111. A base portion 122 of the heater 4A (4B) as the end portion of a quartz tube, is tubular and has a collar 121. An insulated wire 123 is connected to a resistor wire contained in the quartz tube at one end of the base portion 122. When assembling the laser printer 11, a worker directs the forward end of the bent portion 124 of the check plate 111 toward the center of each heater, inserts the insulating wire 123 into the cutaway portion 112 shown in FIG. 10, and thrusts the forward end of the base portion 122 into the opening 113 (see FIG. 10) until the collar 121 comes in contact with the check plate 111. At this time, the paired pawls 114 are in press contact with the circumferential surface of the base portion 122 and are forcibly bent forward. In this way, the heaters 4A and 4B are fastened to the check plate 111. Since two check plates 111 are provided at the right and left ends of the heaters, the above fastening work is applied to both ends of the heaters 4A and 4B.

Figure 12:
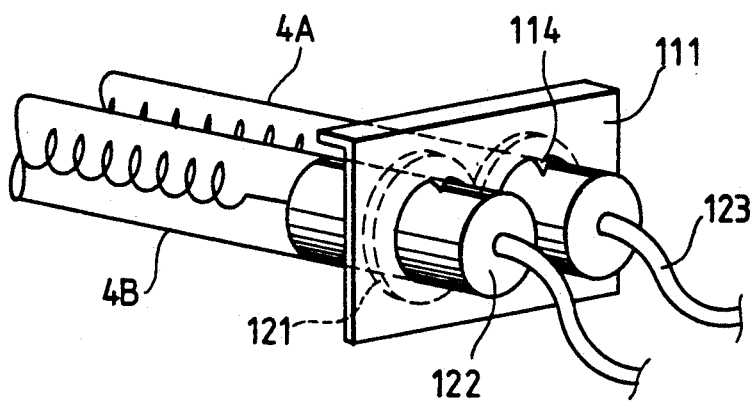
Figure 13:
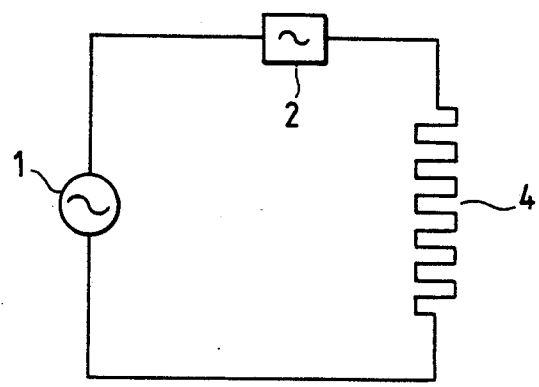
FIG. 13 schematically illustrates a circuit arrangement of a fixation unit that has been used in the image forming apparatus, such as a laser printer.

FIG. 12 is a diagram showing the structure when both heaters are fastened to the check plate in the above manner. The heaters 4A and 4B are fastened in parallel to the check plate 111, while care is taken so as to avoid mutual contact of the quartz tubes of the heaters. Since the two heaters 4A and 4B are fixed by the check plates 111, the work of assembling those components into the heat roller 6 can be done smoothly and easily.

Recently, the image forming apparatus of the electrophotographic type including the laser printer has become smaller and smaller. Accordingly reducing the size of the heat roller has also been required. Therefore, one would be lead to believe that an effective approach is to bond together the tubular members of the heaters, such as the quartz tubes, and to provide the base portions in a single base portion. However, such an approach requires a great alternation of the manufacturing process of the lamp type heaters. The cost to manufacture the heaters is increased and reliability of the resultant heaters is impaired. In this regard, it is best to space the two heaters 4A and 4B as close together as possible.

Returning to FIG. 9, each support plate $5_2$ supports each collar $6_1$ of the heat roller 6, with each bearing $5_2$ interposed therebetween. A gear $6_2$ fixed to one end of the heat roller 6 is in mesh with a gear (not shown). The heat roller 6 receives a motive power through the gear chain, and rotates at a predetermined speed. A fuse $6_3$ and the thermistor 85 tightly contact with the surface of the heat roller 6, to monitor temperature on the surface. A connector 131 with three pins accommodates insulating wires $123_1$ and $123_2$ as derived from the first ends of the heaters 4A and 4B, and an insulating wire $123_3$ connected to a terminal $132_1$ mounted to one end of the fuse $6_3$. A connector 133 with two pins accommodates an insulating wire which is connected to an insulating wire $123_4$ connected to a terminal $132_2$ mounted on the other end of the fuse $6_3$, and an insulating wire $123_5$ derived from the other end of the heater 4A, and an insulating wire $123_6$ derived from the other end of the heater 4B. The two connectors 131 and 133 are used for connecting the low voltage power supply 57A (see FIG. 5) to the external components.

The heat roller 6 is in press contact with the pressure roller 8 that is rotatably supported by a couple of bearings 135. The press contact extends over a predetermined width of the rollers, to form a nip region. Record paper (not shown) passes through the nip region. When passing there, it is heated by the two heaters 4A and 4B and a toner image formed thereon is fused and fixed.

While the pair of heaters 4A and 4B operable by the AC voltage are described, four more heaters may be used. It is evident that the present invention is applicable for any other electric components consuming relatively larger power than the heaters.

It is further evident that the present invention, which has been applied to the laser printer in the above-mentioned embodiment, is applicable for other image forming apparatuses, such as copying machines and facsimiles.

According to the present invention, input AC voltages are classified into two groups by comparing the input AC voltages with a reference voltage. An input AC voltage, which is higher than the reference voltage, is substantially halved and the halved voltage is used. Another input AC voltage, which is lower than the reference voltage, is used as it is. The AC components are operable regardless of the input AC voltage. Accordingly, the cost for the AC components can be reduced.

Further, a couple of heaters with substantially the same characteristics are used, which are to be coupled for reception with an AC input voltage. In use, the heaters are connected selectively in series or in parallel, and therefore, there is no need for the voltage adjusting transformer. This leads to reduce cost in manufacturing the apparatus.

Having described the preferred embodiments of the present invention it will be understood that modifications and variations thereof falling within the spirit and scope of the invention may become apparent to one skilled in the art and that the scope of the invention is to be determined by the appended claims and their equivalents.

What is claimed is:

1. An image forming apparatus having DC components comprising:
    a low voltage DC power source for connection to an AC in voltage source to energize the DC components, said low voltage power source including voltage comparing means for comparing AC input voltage from the AC input voltage source to a predetermined reference voltage;
    an AC electric component which operates on an applied AC voltage; and
    voltage applying means for applying said input AC voltage to said AC electric component in response to a signal from said voltage comparing means indicative of said AC input voltage being lower than said reference voltage, and for applying a converter voltage from said AC input voltage having a value substantially equal to one half of said AC input voltage in response to a signal from said voltage comparing means indicative of said AC input voltage being higher than said reference voltage.

2. The image forming apparatus of claim 1, wherein said electric component comprises a fusing unit of the image forming apparatus.

3. The image forming apparatus of claim 2, wherein said fusing unit comprises a heat roller having a roller surface and a heater contained therein.

4. The image forming apparatus of claim 3, wherein said fusing unit further comprises governing means for controlling the temperature of said heat roller in accordance with the temperature of the roller surface.

5. The image forming apparatus of claim 4, wherein said governing means comprises:
    sensing means for outputting data corresponding to the temperature of said heat roller surface;
    means for selectively connecting and disconnecting said heater from the applied AC voltage; and
    control means for processing the output data from said sensing means, and for controlling said means for selectively connecting and disconnecting said heater based on said data.

6. The image forming apparatus of claim 1, wherein said voltage applying means comprises:

switching means having a first output terminal and a second output terminal;

transformer means having a primary winding and a secondary winding, said primary winding being connected at one end to said AC input voltage, and connected in the middle to said second output terminal of said switching means, and at the other end to said first output terminal of said switching means, said secondary winding being connected at each end to said AC electric component.

7. An image forming apparatus having DC components, comprising:

a low voltage DC power source for connection to an AC input voltage source to energize the DC components, said low voltage DC power source including voltage comparing means for comparing an AC input voltage from the AC input voltage source to a predetermined reference voltage;

a fusing unit having a pair of substantially identical heaters which operate on an applied AC voltage; and connection control means for connecting said pair of heaters in parallel in response to a signal received from said voltage comparing means indicative of said AC input voltage being lower than said reference voltage, and connecting said pair of heaters in series in a response to a signal received from said voltage comparing means indicative of said AC input voltage being higher than said reference voltage.

8. The image forming apparatus of claim 7 comprising a heat roller enclosing said pair of heaters;

governing means for controlling the temperature of the heat roller, said governing means including:

means for sensing the temperature of said heat roller and generating output data corresponding to the sensed temperature, means for selectively connecting and disconnecting said pair of heaters from the applied AC voltage, and control means for processing the output data received from said sensing means, and for controlling said means for selectively connecting and disconnecting said pair of heaters based on said output data.

9. A laser printer having DC components comprising:

a low voltage DC power source for connection to an AC input voltage source to engage the DC components, said low voltage DC power source including voltage comparing means for comparing an AC input voltage from the AC input voltage source to a predetermined reference voltage;

an AC electric component which operates on an applied AC voltage; and voltage applying means for coupling said input AC voltage to said AC electric component in response to a signal received from said voltage comparing means indicative of said AC input voltage being lower than said reference voltage, and coupling a converted voltage from said AC input voltage having a value substantially equal to one half of said AC input voltage in response to a signal received from said voltage comparing means indicative of said AC input voltage being higher than said reference voltage.

10. The laser printer of claim 9, wherein said electric component comprises a fusing unit of the laser printer.

11. The laser printer of claim 10, wherein said fusing unit comprises a heat roller having a roller surface and a heater contained therein.

12. The laser printer of claim 11, wherein said fusing unit further comprises governing means for controlling the temperature of said heat roller in accordance with the temperature of the roller surface.

13. The laser printer of claim 12, wherein said governing means comprises:

means for sensing the temperature of said heat roller and generating output data corresponding to the sensed temperature;

means for selectively connecting and disconnecting said heater from the applied AC voltage; and control means for processing the output data received from said sensing means, and for controlling said means for selectively connecting and disconnecting said heater based on said output data.

14. The laser printer of claim 9, wherein said voltage applying means comprises:

switching means having a first output terminal and a second output terminal; and transformer means having a primary winding and a secondary winding, said primary winding being connected at one end to said AC input voltage, and connected in the middle to said second output terminal of said switching means, and at the outer end to said first output terminal of said switching means, and said secondary winding being connected at each end to said AC electric component.

15. A laser printer having DC components comprising:

a low voltage DC power source for connection to an AC input voltage source to energize the DC components, said low voltage DC power source including voltage comparing means for comparing an AC input voltage to a predetermined reference voltage;

a pair of substantially identical heaters which operate on an applied AC voltage; and connection control means for connecting said pair of heaters in parallel in response to a signal received from said voltage comparing means indicative of said AC input voltage being lower than said reference voltage, and connecting said pair of heaters in series in response to a signal received from said voltage comparing means indicative of said AC input voltage being higher than said reference voltage.

16. The laser printer of claim 15, comprising a heat roller having a surface enclosing said pair of heaters, governing means for controlling the temperature of the heat roller, said governing means comprising:

means for sensing the surface temperature of said heat roller and generating output data corresponding there, means for selectively connecting and disconnecting said pair of heaters from the applied voltage; and control means for processing the output data received from said sensing means, and for controlling said means for selectively connecting and disconnecting said pair of heaters based on said output data.

* * * * *

UNITED STATES PATENT AND TRADEMARK OFFICE
CERTIFICATE OF CORRECTION

PATENT NO. : 5,229,577
DATED : July 20, 1993
INVENTOR(S) : Tomoyuki Matsuura et al.

It is certified that error appears in the above-indentified patent and that said Letters Patent is hereby corrected as shown below:

Claim 1, column 10, line 31, change "in" to --input--.

Claim 1, column 10, line 33, before "AC" insert --an--.

Claim 16, column 12, line 59, change "there" to --thereto--.

Signed and Sealed this

Tenth Day of May, 1994

Attest:

BRUCE LEHMAN

Attesting Officer

Commissioner of Patents and Trademarks